Patented June 8, 1943

2,321,292

UNITED STATES PATENT OFFICE 2,321,292

VINYLIDENE CHLORIDE-GRAPHITE COMPOSITION

Alden W. Hanson, Midland, Mich., assignor to The Dow Chemical Company, Midland, Mich., a corporation of Michigan No Drawing. Application May 14, 1941, Serial No. 393,419

6 Claims. (Cl. 260—41)

This invention relates to compositions of matter comprising a preponderance of a vinylidene chloride polymer or co-polymer, and containing graphite. It relates as well to articles producible from such compositions, especially by molding or extrusion means.

It is known that the polymer or vinylidene chloride, and most of its co-polymers with other polymerizable compounds, are thermoplastic and can be molded or extruded to form useful articles. It is not for their thermoplasticity alone, however, that many of these polymers are particularly noted. The polymer of vinylidene chloride alone and many of its co-polymers and their plastic compositions are crystalline, by X-ray diffraction criteria, and, when fabricated in such a manner as to provide fiber orientation in the finished article, exhibit unusually high tensile strength values. A preferred mode of treatment to obtain the desirable strength properties is described by Wiley in U. S. 2,183,602, and comprises heating the polymer to a fusion temperature, chilling to provide a supercooled and temporarily non-crystalline form of the polymer, and then cold working to obtain crystallization within the mass and concurrent orientation of the crystals. Vinylidene chloride polymer compositions which exhibit crystallinity by characteristic X-ray diffraction patterns, are the ones primarily concerned in the present invention, and will be designated simply as "crystalline vinylidene chloride polymers."

Rods, filaments, cordage, and numerous other articles made from crystalline vinylidene chloride polymers and treated as described to provide preferential orientation within the article, exhibit high strength relative to cross-sectional area, but are normally found to have low strength transverse to the direction of orientation. Thus, a strand or filament may have a tensile strength of 30,000 to 50,000 pounds per square inch, but, when tied in a simple overhand knot and pulled, will have a knot strength usually less than half its strength in unknotted form. Sharp blows transverse to the axis of orientation may cause breakage, fibering, or splintering, particularly at low temperatures. At temperatures encountered outdoors during the winter months, cordage of crystalline vinylidene chloride polymers may become too brittle to withstand flexing without cracking or breaking. When vinylidene chloride polymer strands are employed, for example, in a cable core, and the cable is to operate over a pulley of 6 inch diameter at a temperature of 10° F., the core may fracture, making the cable practically worthless.

It is, accordingly, an object of the present invention to provide a composition of matter comprising a preponderance of a crystalline vinylidene chloride polymer, and capable of forming oriented articles having relatively high cold strength and relatively high strength transverse to the direction of orientation, as compared with the same properties of similar articles made from the same crystalline polymer alone. Other and related objects will appear hereinafter.

It has now been found that the foregoing and related objects may be attained through use of a new composition to be specified below, and that said composition may be molded or extruded to form useful articles having the above-stated desired properties. The new composition of the present invention comprises a preponderance, preferably from 70 to 95 per cent by weight, of a thermoplastic polymer of vinylidene chloride, and a minor proportion, preferably from 5 to 30 per cent, of graphite. The preferred composition is one containing a normally crystalline vinylidene chloride polymer. The composition may contain, in addition to the two named ingredients, suitable amounts of plasticizers, coloring agents, or agents capable of improving the stability of the polymer toward light or heat. It may contain a single thermoplastic vinylidene chloride polymer or co-polymer, or it may contain a mixture of such polymers. The graphite employed may be natural or flake graphite, or it may be electric furnace graphite powder.

The new composition may be molded to form useful shaped articles, but the most advantageous use to which it has as yet been put is in the fabrication of extruded articles, such as rods, filaments, and like long articles of relatively small cross-sectional area. When the vinylidene chloride polymer employed is a normally crystalline polymer, the new composition may be fused, extruded, chilled to supercool the polymer, and then stretched or otherwise cold worked to effect crystallization and orientation within the article. Whether or not the polymer is crystalline, the articles fabricated from the new composition have greater cold shock resistance than have articles of compositions made from the same polymer but without the graphite.

The following example illustrates various compositions falling within the scope of the invention.

*Example*

To each of several samples of a powdered co-polymer of about 90 per cent vinylidene chloride and about 10 per cent vinyl chloride, was added about 7 per cent of di-(alpha-phenylethyl) ether, as plasticizer and heat stabilizer, and an amount of graphite specified in the following table. The ingredients were mixed thoroughly in a ball mill, and the compositions were then extruded, at a temperature above the softening point of the polymer, to form filaments, which were chilled by immersion in cold water. The supercooled filaments were stretched to about 4 times their supercooled length, thereby taking up substantially all plastic flow of which the article was capable while cold, without rupture. Some of the filaments were tested for tensile strength, while others were used as gland packings in a rotary pump, and still others were subjected to tests to be described hereinafter.

Table

| Sample No. | Graphite | | Tensile strength, pounds per square inch |
|---|---|---|---|
| | Amount[1] | Kind | |
| 0 | 0 | None | 34,000 |
| 1 | 2.5 | Flake | 19,500 |
| 2 | 5 | ---do--- | 18,000 |
| 3 | 5 | Aquadag | 32,000 |
| 4 | 7.5 | Flake | 18,000 |
| 5 | 15 | ---do--- | 22,000 |
| 6 | 20 | ---do--- | |
| 7 | 20 | ---do--- | |
| 8 | 20 | Aquadag | |
| 9 | 20 | Oildag | |
| 10 | 30 | Flake | |
| 11 | 30 | ---do--- | |
| 12 | 30 | ---do--- | |
| 13 | 50 | ---do--- | |
| 14 | 50 | ---do--- | |
| 15 | 50 | Aquadag | |

[1] Parts per 100 parts of polymer plus plasticizer.

The wearing qualities of articles fabricated from the compositions were tested under conditions where both longitudinal strength and transverse strength were brought into play. These tests may be illustrated as follows:

Several filaments of the vinylidene chloride-vinyl chloride co-polymer and plasticizer, but without graphite, were extruded and stretched to provide a final diameter of about 0.068 inch. A like number of filaments of the same size were prepared from composition number 9, above. To each of the filaments was fastened a 2-pound weight, the filament being bent to form a loop above the dependent weight. Each weighted loop, was, in turn, hung on a horizontal iron rod which was rotated at a rate of 1725 revolutions per minute. The time required for the rapidly revolving rod to wear through the weighted filaments was determined. The average time required to wear through the "blank" filaments was 9.5 minutes, with a variation from the mean of only about 15 seconds. The average time required to wear through the graphited filaments was 66.5 minutes, with a maximum variation from the mean of only 2.5 minutes.

Several of the graphite-containing compositions of the Example were employed as cable cores in place of the customary rubber, hemp or other core materials. Similar cables, made using graphite-free vinylidene chloride, were prepared and both types were subjected to the same tests. Some of the cables were chilled to 10° F. and were then subjected to sharp blows. The graphite-containing core stood up well, and the graphite-free core fractured. In accelerated wear tests the graphite-containing cables outlasted the others by a factor of at least 6 times.

The graphited filaments were employed for a variety of uses, including their application as gland packings around rotating shafts, where they gave long-lived service. Owing to their inertness to solvents and to chemical reagents, they were unaffected under conditions which ordinarily render the usual graphited "wicking" ineffective.

Valuable gland packing material may be made in the form of plasticized filaments containing graphite, and then, to provide a somewhat spongy mass with greater resilience than the usual filament of vinylidene chloride polymers, may be heated to a temperature adapted to volatilize at least a part of the plasticizer from the article.

Lacquers were prepared from the softer, more readily soluble co-polymers of vinylidene chloride, such as that of 85 per cent vinylidene chloride, 10 per cent ethyl acrylate, and 5 per cent methyl methacrylate, by dissolving the polymer in dioxane, adding graphite to the solution, and thinning carefully with a 50–50 toluene and mineral spirits mixture. Coatings deposited from the lacquer were far more abrasion resistant, and were apparently much tougher than were films of the co-polymer alone, deposited from the same solvents. Where the black color of graphite is no handicap, the new composition is of marked advantage.

The invention has been illustrated with respect to two specific co-polymers of vinylidene chloride, but it is to be understood that it is not so limited. Any of the thermoplastic vinylidene chloride polymers, and particularly the crystalline polymers and co-polymers of vinylidene chloride, may be employed in lieu of the ones shown in the examples, and with like advantage.

I claim:

1. A composition of matter comprising a preponderance of a thermoplastic vinylidene chloride polymer and a minor proportion of graphite.

2. A composition of matter comprising a preponderance of a normally crystalline vinylidene chloride polymer, and a minor proportion of graphite.

3. A composition of matter comprising from 70 to 95 per cent of a thermoplastic polymer of vinylidene chloride, and not to exceed, correspondingly, from 30 to 5 per cent of graphite.

4. A composition of matter comprising from 70 to 95 per cent of a normally crystalline vinylidene chloride polymer, and not to exceed, correspondingly, from 30 to 5 per cent of graphite.

5. An extruded article comprising a preponderance of a thermoplastic vinylidene chloride polymer and a minor proportion of graphite.

6. An extruded article comprising from 70 to 95 per cent of a normally crystalline vinylidene chloride polymer, and not to exceed, correspondingly, from 30 to 5 per cent of graphite.

ALDEN W. HANSON.